United States Patent
Finlow-Bates et al.

(10) Patent No.: US 9,646,499 B1
(45) Date of Patent: May 9, 2017

(54) CROWDSOURCED DETECTION OF DEFECTIVE STREET LIGHTS

(71) Applicant: QUALCOMM Incorporated, San Diego, CA (US)

(72) Inventors: Keir Finlow-Bates, Kangasala (FI); Kim Vaarala, Nokia (FI); Koushik Annapureddy, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/080,521

(22) Filed: Mar. 24, 2016

(51) Int. Cl.
| | |
|---|---|
| *G01C 21/00* | (2006.01) |
| *G08G 1/00* | (2006.01) |
| *B60R 11/04* | (2006.01) |
| *B60Q 1/14* | (2006.01) |
| *H04L 29/08* | (2006.01) |

(52) U.S. Cl.
CPC ............. *G08G 1/20* (2013.01); *B60Q 1/1423* (2013.01); *B60R 11/04* (2013.01); *H04L 67/22* (2013.01)

(58) Field of Classification Search
CPC ................................ G08G 1/20; B60Q 1/1423
See application file for complete search history.

(56) References Cited

U.S. PATENT DOCUMENTS

| | | | |
|---|---|---|---|
| 8,972,175 B2 | 3/2015 | Annapureddy et al. | |
| 2002/0013679 A1 | 1/2002 | Petite | |
| 2007/0263222 A1 | 11/2007 | Loveless | |
| 2014/0111098 A1* | 4/2014 | Amarin | H05B 37/0272 315/152 |
| 2015/0173156 A1* | 6/2015 | Pedersen | H05B 37/0272 315/151 |
| 2015/0264776 A1* | 9/2015 | Amarin | G06Q 10/0875 315/129 |

FOREIGN PATENT DOCUMENTS

| | | |
|---|---|---|
| WO | 2012143814 A1 | 10/2012 |
| WO | 2014147524 A1 | 9/2014 |

OTHER PUBLICATIONS

Bezbradica M., et al., "Advanced Street Lighting Maintenance using GPS, Light Intensity Measuring and Incremental Cost-Effectiveness Ratio," International Conference on High Performance Computing & Simulation (HPCS), 2014, pp. 670-675.

(Continued)

*Primary Examiner* — Adam Alharbi
(74) *Attorney, Agent, or Firm* — Muncy, Geissler, Olds & Lowe, P.C.

(57) ABSTRACT

A method for the crowdsourced detection of defective street lights includes receiving reporting data from a plurality of vehicles, where each reporting data includes: (i) at least one light intensity value measured by at least one sensor of a respective vehicle, (ii) a time that the light intensity value was measured by the respective vehicle, and (iii) a location of the respective vehicle at the time that the light intensity value was measured. The method also includes obtaining a baseline light intensity value for at least one street light at the location and combining the reporting data received from the plurality of vehicles to generate combined light intensity data for the location. An indication of a degradation of performance of the at least one street light is then generated in response to a comparison of the combined light intensity data to the baseline light intensity value.

20 Claims, 9 Drawing Sheets

(56) References Cited

OTHER PUBLICATIONS

Huang H.B., et al., "Poster Abstract: Detecting Faulty Street Lamps with Illumination Maps," ACM/IEEE 11th International Conference on Information Processing in Sensor Networks (IPSN), 2012, pp. 85-86.
"Pothole Alert 311", Android Apps on Google Play, dated Jul. 1, 2015, Retrieved from the Internet: URL: https://play.google.com/store/apps/details?id=com.shake&hl=en, [retrieved on Jul. 28, 2015], 3 Pages.
"Report, View, or Discuss Local Problems", dated Jul. 28, 2015, Retrieved from the Internet: URL: https://www.fixmystreet.com/, [retrieved on Jul. 28, 2015], p. 1.

* cited by examiner

| LOCATION | # OF REPORTING DATA | AVERAGE LIGHT INTENSITY VALUES | DATE (DURING SUNSET) | ONCOMING VEHICLE PROBABILITY | EXPECTED LIGHT INTENSITY VALUES |
|---|---|---|---|---|---|
| 1 | 14000 | 95 % | 27 MAY | 8.5 % | 95 % |
| 2 | 14000 | 65 % | 27 MAY | 10 % | 80 % |
| ⋮ | ⋮ | ⋮ | ⋮ | ⋮ | ⋮ |
| 65 | 10000 | 0 % | 29 MAY | 5 % | 95 % |
| 66 | 10000 | 0 % | 29 MAY | 5 % | 95 % |

CROWDSOURCED DETECTION OF DEFECTIVE STREET LIGHTS

FIELD OF DISCLOSURE

This disclosure relates generally to the detection of defective street lights, and in particular, but not exclusively, relates to the crowdsourced detection of defective street lights.

BACKGROUND

Outdoor lighting systems, such as lighting for roadways, streets, and parking facilities typically include several street lights deployed to improve the safety for drivers, riders, and/or pedestrians. Such outdoor lighting systems have also been shown to help reduce crime as well. Thus, continued operation of the street lights may be an important aspect of any deployed outdoor lighting system.

However, one or more street lights of an outdoor lighting system may become defective after initial deployment, either by not functioning at all, by producing less than the desired light output, and/or by not turning on at the desired times. The maintenance of these outdoor lighting systems are typically performed by a regional municipality or a designated maintenance authority. Regardless, the sheer number of street lights typically included in an outdoor lighting system may make the task of detecting defective street lights difficult and time consuming. Some municipalities simply resort to relying on a manual reporting system, where citizens are expected to report observed problems with the outdoor lighting system. For example, the municipality may provide a hotline for citizens to call and report a street light that is not functioning properly. However, in these cases it has been found that people rarely know about the reporting system, or even if they do, they rarely take the time to contact the appropriate authorities. Other municipalities may rely on a more proactive approach where workers are sent out to drive around manually inspecting street lights. However, this approach is a time and effort intensive task. Furthermore, there are even incidents where street lights may fail in an inconsistent manner, such that it may be difficult to spot a defective street light in a single inspection.

SUMMARY

The following presents a simplified summary relating to one or more aspects and/or embodiments associated with the mechanisms disclosed herein for the crowdsourced detection of defective street lights. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary presents certain concepts relating to one or more aspects and/or embodiments relating to the mechanisms disclosed herein for the crowdsource detection of defective street lights in a simplified form to precede the detailed description presented below.

According to one aspect, a method for the crowdsourced detection of defective street lights includes receiving reporting data from a plurality of vehicles, where the reporting data includes: (i) at least one light intensity value measured by at least one sensor of a respective vehicle, (ii) a time that the light intensity value was measured by the respective vehicle, and (iii) a location of the respective vehicle at the time that the light intensity value was measured. The method also includes obtaining a baseline light intensity value for at least one street light at the location and combining the reporting data received from the plurality of vehicles to generate combined light intensity data for the location. An indication of a degradation of performance of the at least one street light is then generated in response to a comparison of the combined light intensity data to the baseline light intensity value.

According to another aspect, an apparatus for the crowdsourced detection of defective street lights includes means for receiving reporting data from a plurality of vehicles. The reporting data includes: (i) at least one light intensity value measured by at least one sensor of a respective vehicle, (ii) a time that the light intensity value was measured by the respective vehicle, and (iii) a location of the respective vehicle at the time that the light intensity value was measured. The apparatus also includes means for obtaining a baseline light intensity value for at least one street light at the location, as well as a means for combining the reporting data received from the plurality of vehicles to generate combined light intensity data for the location. Further included in the apparatus are means for comparing the combined light intensity data to the baseline light intensity value, and means for generating an indication of a degradation of performance of the at least one street light based on the comparing of the combined light intensity data to the baseline light intensity value.

According to yet another aspect, an apparatus for the crowdsourced detection of defective street lights includes at least one processor and at least one memory coupled to the at least one processor. The at least one processor and the at least one memory are configured to direct the apparatus to receive reporting data from a plurality of vehicles, where the reporting data includes: (i) at least one light intensity value measured by at least one sensor of a respective vehicle, (ii) a time that the light intensity value was measured by the respective vehicle, and (iii) a location of the respective vehicle at the time that the light intensity value was measured. The at least one processor and the at least one memory are further configured to direct the apparatus to: (a) obtain a baseline light intensity value for at least one street light at the location, (b) combine the reporting data received from the plurality of vehicles to generate combined light intensity data for the location, (c) compare the combined light intensity data to the baseline light intensity value, and (d) generate an indication of a degradation of performance of the at least one street light based on the comparing of the combined light intensity data to the baseline light intensity value.

According to another aspect, a non-transitory computer-readable storage medium includes computer-executable instructions recorded thereon. Executing the computer-executable instructions on one or more processors causes an apparatus to receive reporting data from a plurality of vehicles, where the reporting data includes: (i) at least one light intensity value measured by at least one sensor of a respective vehicle, (ii) a time that the light intensity value was measured by the respective vehicle, and (iii) a location of the respective vehicle at the time that the light intensity value was measured. Executing the computer-executable instructions on one or more processors further causes to apparatus to: (a) obtain a baseline light intensity value for at least one street light at the location, (b) combine the reporting data received from the plurality of vehicles to generate combined light intensity data for the location, (c) compare the combined light intensity data to the baseline light intensity value, and (d) generate an indication of a degradation of performance of the at least one street light based on the comparing of the combined light intensity data to the baseline light intensity value.

Other objects and advantages associated with the mechanisms disclosed herein for the crowdsourced detection of defective street lights described herein will be apparent to those skilled in the art based on the accompanying drawings and detailed description.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
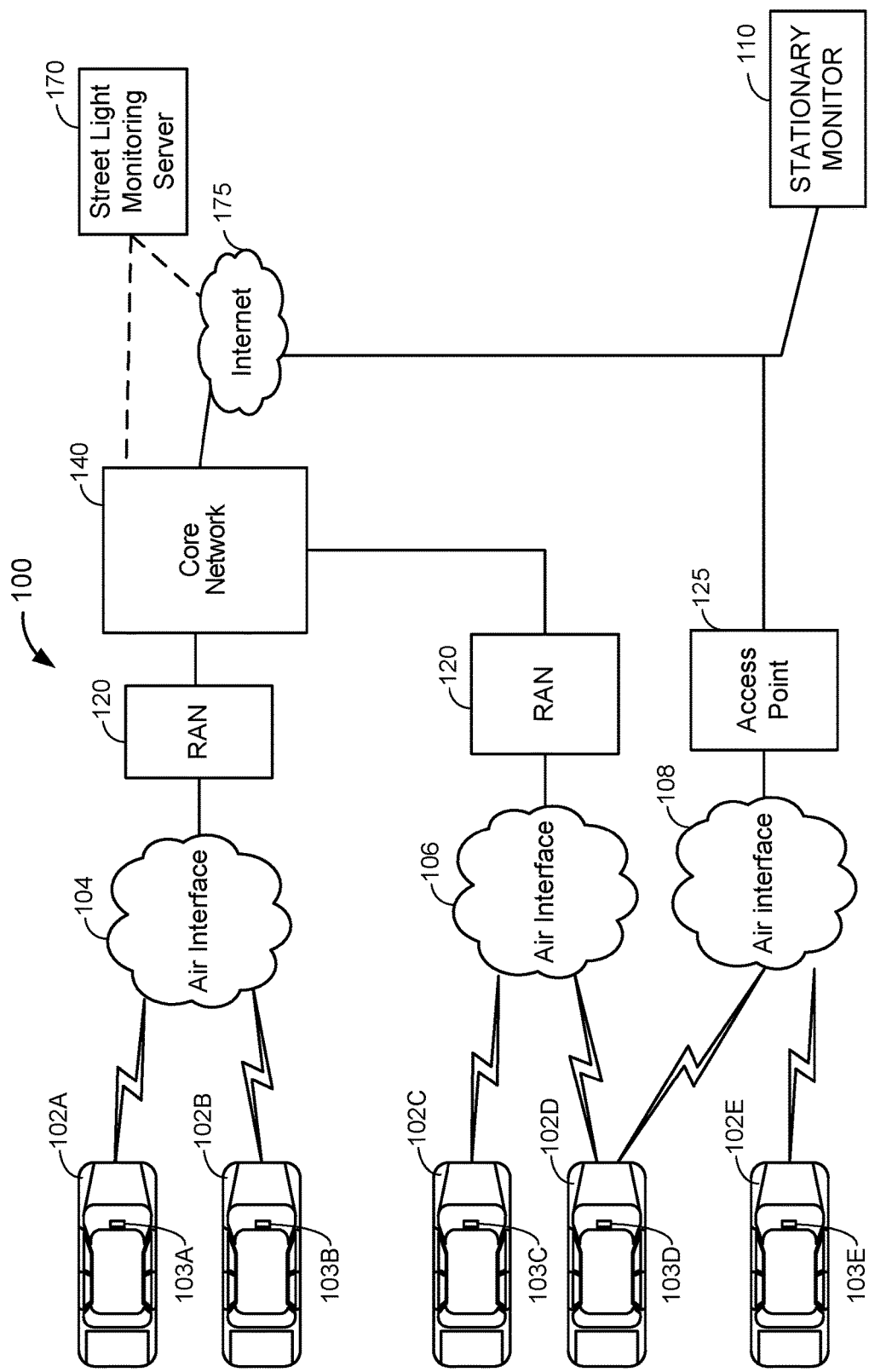
FIG. 1 illustrates an example operating environment for several vehicles that can provide reporting data for the crowdsourced detection of defective street lights, according to aspects of the disclosure.

FIG. 1 illustrates an example operating environment 100 for several vehicles 102A-102E that can provide reporting data for the crowdsourced detection of defective street lights, according to aspects of the disclosure. The vehicles 102A-102E are configured to communicate with an access network (e.g., a radio access network (RAN) 120 or an access point 125, etc.) over a physical communications interface or layer, shown in FIG. 1 as air interfaces 104, 106, 108. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve vehicles 102A-102D over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including mediating an exchange of packet-switched (PS) data with external networks such as Internet 175. The Internet 175 includes a number of routing agents and processing agents (not shown in FIG. 1). In FIG. 1, a stationary monitor 110 is shown as connecting to the Internet 175 directly (i.e., separate from the core network 140, such as over an Ethernet connection of WiFi or 802.11-based network).

Also shown in FIG. 1 is an access point 125 that is separate from the RAN 120. The access point 125 may be connected to the Internet 175 independent of the core network 140 (e.g., via an optical communication system such as FiOS, a cable modem, etc.). The air interface 108 may serve vehicle 102D and 102E over a local wireless connection, such as IEEE 802.11 in an example. The stationary monitor 110 is shown with a wired connection to the Internet 175, such as a direct connection to a modem or router, which can correspond to the access point 125, itself, in an example (e.g., for a WiFi router with both wired and wireless connectivity).

Each vehicle 102A-102E includes a sensor (103A-103E, respectively) for measuring light intensity values as each vehicle travels through various locations. In one aspect, the sensors 103A-103E are outwards-facing light sensors mounted into or on a windshield of the vehicle. In another aspect, one or more of the sensors 103A-103E may be a camera such as a dash-mounted camera of the vehicle. Each vehicle 102A-102E may then provide their respective reporting data to the street light monitoring server 170 via the core network 140 and/or the Internet 175. The reporting data may include a light intensity value measured by a sensor of the vehicle (e.g., vehicle 102A provides reporting data that includes a light intensity value measured with sensor 103A), as well as a time and location of the vehicle when the light intensity value was measured. The operating environment 100 further includes a stationary monitor 110 that may provide further reporting data to the street light monitoring sever 170 relating to light intensity values measured by a sensor (not shown) included in stationary monitor 110.

As will be described in more detail below, the street light monitoring server 170 is configured to support the crowd-sourced detection of defective street lights based on reporting data received from a plurality of vehicles 102A-102E and/or stationary monitor 110. The street light monitoring server 170 can be implemented as a plurality of structurally separate servers, or alternately may correspond to a single server.

As used herein, the term "vehicle" may refer to any type of mobile machine which may transfer information over a network and also have position determination and light sensor functionality. The vehicle may be any motor vehicle (motorcycle, car, truck, bus), railed vehicle (train, tram, light-rail), or watercraft (ship, boat), whether manned or unmanned. The term "vehicle" may also refer to a bicycle, or any of the above listed vehicles when paired with a mobile communications device (e.g., mobile phone/device) for aiding in the generation and/or communication of the aforementioned reporting data.

Figure 2:
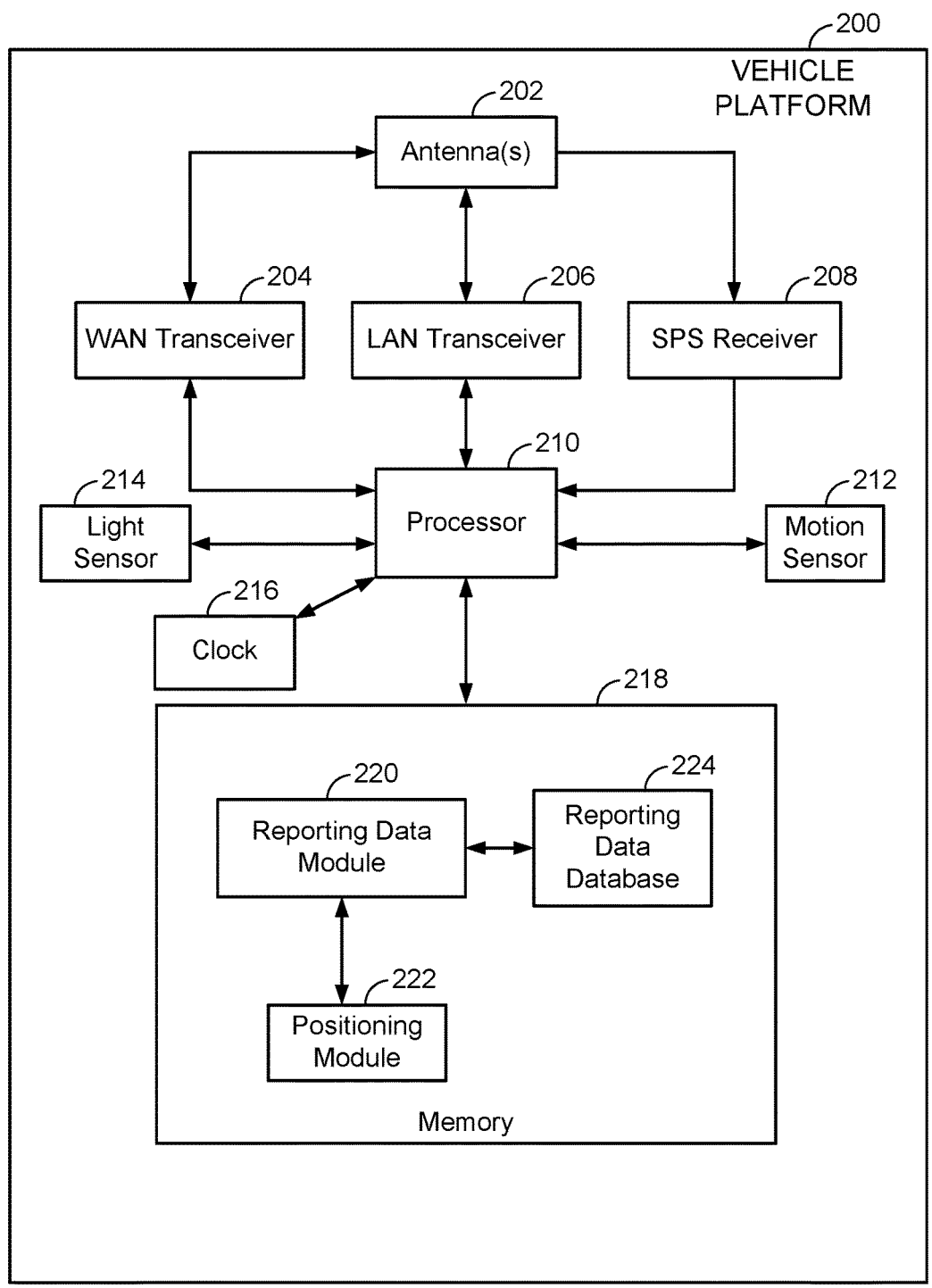
FIG. 2 illustrates an example vehicle platform that may be used in an operating environment for providing reporting data, according to aspects of the disclosure.

FIG. 2 illustrates an example vehicle platform 200 that may be used in an operating environment for providing reporting data, according to aspects of the disclosure. The various features and functions illustrated in the diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined. The illustrated vehicle platform 200 of FIG. 2 is one possible implementation of a platform incorporated into one or more of the vehicles 102A-102E and/or stationary monitor 110 of FIG. 1.

The vehicle platform 200 may include one or more wide area network (WAN) transceiver(s) 204 that may be connected to one or more antennas 202. The WAN transceiver 204 comprises suitable devices, hardware, and/or software for communicating with and/or detecting signals to/from RAN 120, and/or directly with other wireless devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The vehicle platform 200 may also include one or more local area network (LAN) transceivers 206 that may be connected to one or more antennas 202. The LAN transceiver 206 comprises suitable devices, hardware, and/or software for communicating with and/or detecting signals to/from Access point 125, and/or directly with other wireless devices within a network. In one aspect, the LAN transceiver 206 may comprise a Wi-Fi (802.11x) communication system suitable for communicating with one or more wireless access points; however in other aspects, the LAN transceiver 206 comprise another type of local area network, personal area network, (e.g., Bluetooth). Additionally, any other type of wireless networking technologies may be used, for example, Ultra Wide Band, ZigBee, wireless USB etc.

In some aspects, vehicle platform 200 can exploit signals from RANs, from APs, or any combination of the two. The specific type of AP being utilized by the vehicle platform 200 may depend upon the environment of operation. Moreover, the vehicle platform 200 may dynamically select between the various types of RANs/APs in order to achieve an optimal connection to street light monitoring server 170 (see FIG. 1). In other embodiments, various network elements may operate in a peer-to-peer manner, whereby, for example, the vehicle platform 200 may be replaced with the WAP, or vice versa. Other peer-to-peer embodiments may include another vehicle platform (not shown) acting in place of one or more WAP.

An SPS receiver 208 may also be included in the vehicle platform 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the vehicle platform's 200 position using measurements obtained by any suitable SPS algorithm.

A motion sensor 212 may be coupled to a processor 210 to provide movement and/or orientation information which is independent of motion data derived from signals received by the WAN transceiver 204, the LAN transceiver 206 and the SPS receiver 208.

By way of example, the motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor, or any combination thereof. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The illustrated example of vehicle platform 200 also includes a light sensor 214. Light sensor 214 is one possible implementation of light sensors 103A-103E of FIG. 1. The light sensor 214 may be a rain/light sensor located on or integrated into a windshield of the vehicle and configured to detect the amount of rain and/or light incident onto the vehicle. In another example, light sensor 214 may be a luminance sensor configured to detect the ambient brightness surrounding the vehicle. In yet another example, the light sensor 214 may be a sensor integrated into the vehicle for the primary purpose of automatically detecting whether to dim the headlights of a vehicle, automatically darkening a rear-view mirror, and/or for automatically adjusting the windshield opacity. In operation, light sensor 214 is configured to generate one or more light intensity values representative of a lighting condition exterior to the vehicle. In one example, the light intensity value may be in units of lumens.

In another example, the light sensor 214 may include a camera, such as a dash-mounted camera, or other forwards-facing camera. A light intensity value may then be derived from one or more images captured by the camera (e.g., average intensity of the one or more images).

Vehicle platform 200 may further include an optional clock 216. Clock 216 is configured to provide time information that is independent of any time information that may be obtained from SPS receiver 208. In one implementation, clock 216 is configured to provide timing information (e.g., a timestamp) corresponding to the time that a light intensity value is measured by light sensor 214.

The processor 210 may be connected to the WAN transceiver 204, LAN transceiver 206, the SPS receiver 208, the motion sensor 212, the light sensor 214, and the clock 216. The processor 210 may include one or more microprocessors, microcontrollers, and/or digital signal processors that provide processing functions, as well as other calculation and control functionality. The processor 210 may also include memory 218 for storing data and software instructions for executing programmed functionality within the vehicle platform 200. The memory 218 may be on-board the processor 210 (e.g., within the same IC package), and/or the memory may be external memory to the processor 210 and functionally coupled over a data bus. The functional details associated with aspects of the disclosure will be discussed in more detail below.

A number of software modules and data tables may reside in memory 218 and be utilized by the processor 210 in order to manage both communications and the generating of reporting data. As illustrated in FIG. 2, memory 218 may include and/or otherwise receive a reporting data module 220, a positioning module 222, and a reporting data database 224. The organization of the memory contents as shown in FIG. 2 is merely exemplary, and as such the functionality of the modules and/or data structures may be combined, separated, and/or be structured in different ways depending upon the implementation of the vehicle platform 200.

The positioning module 222 may determine a position of the vehicle platform 200 from based on a position fix (e.g., GPS position fix) received from SPS receiver 208. However, in some examples, positioning module 222 may derive the position of the vehicle platform 200 using information derived from time information measured from signals exchanged with a plurality of wireless APs and/or by using information obtained by the motion sensor 212.

The reporting data module 220 is configured to generate the reporting data for transmission to the street light monitoring server 170. The reporting data includes: (i) a light intensity value measured by light sensor 214, (ii) a time (e.g., timestamp), obtained from, e.g., clock 216 or SPS receiver 208, corresponding to the time that the light intensity value was measured, and (iii) a location, obtained from positioning module 222, of the vehicle platform 200 at the time that the light intensity value was measured. In some examples the location included in the reporting data is a position fix of the vehicle platform 200, such as a GPS position fix obtained from SPS receiver 208. In other examples, the location included in the reporting data is a position fix, determined from one or more other techniques for determining the position of the vehicle platform 200, such as cellular tower triangulation, Bluetooth or RFID systems, dead reckoning, and/or visual-based tracking algorithms. In yet another example, the location included in the reporting data includes a speed and/or heading of the vehicle platform 200 in addition to the position fix. As will be described below, the heading and/or speed may be used by the street light monitoring server 170, in part, to determine non-street light illumination. In some examples, the heading and/or speed data may be obtained from SPS receiver 208 and/or from motion sensor 212.

In some implementations, the reporting data module 220 is configured to continuously generate and transmit the reporting data to the street light monitoring server 170 as the vehicle platform 200 travels through an operating environment 100. In other implementations, the reporting data module 220 is configured to continuously generate the reporting data, but to only periodically transmit the reporting data to the street light monitoring server 170. For example, the reporting data module 220 may generate and store reporting data in a reporting data database 224, where the reporting data stored in the reporting data database 224 may be uploaded to the street light monitoring server 170 according to a predetermined schedule or when network connectivity becomes available.

While the modules shown in FIG. 2 are illustrated in the example as being contained in the memory 218, it is recognized that in certain implementations such procedures may be provided for or otherwise operatively arranged using other or additional mechanisms. For example, all or part of the reporting data module 220 and/or positioning module 222 may be provided in firmware. Additionally, while in this example the reporting data module 220 and positioning module 222 are illustrated as being separate features, it is recognized, for example, that such procedures may be combined together as one procedure or perhaps with other procedures, or otherwise further divided into a plurality of sub-procedures.

The processor 210 may include any form of logic suitable for performing at least the techniques provided herein. For example, the processor 210 may be operatively configurable based on instructions in the memory 218 to selectively initiate one or more routines that generate reporting data for use in other portions of the vehicle platform 200.

Figure 3:
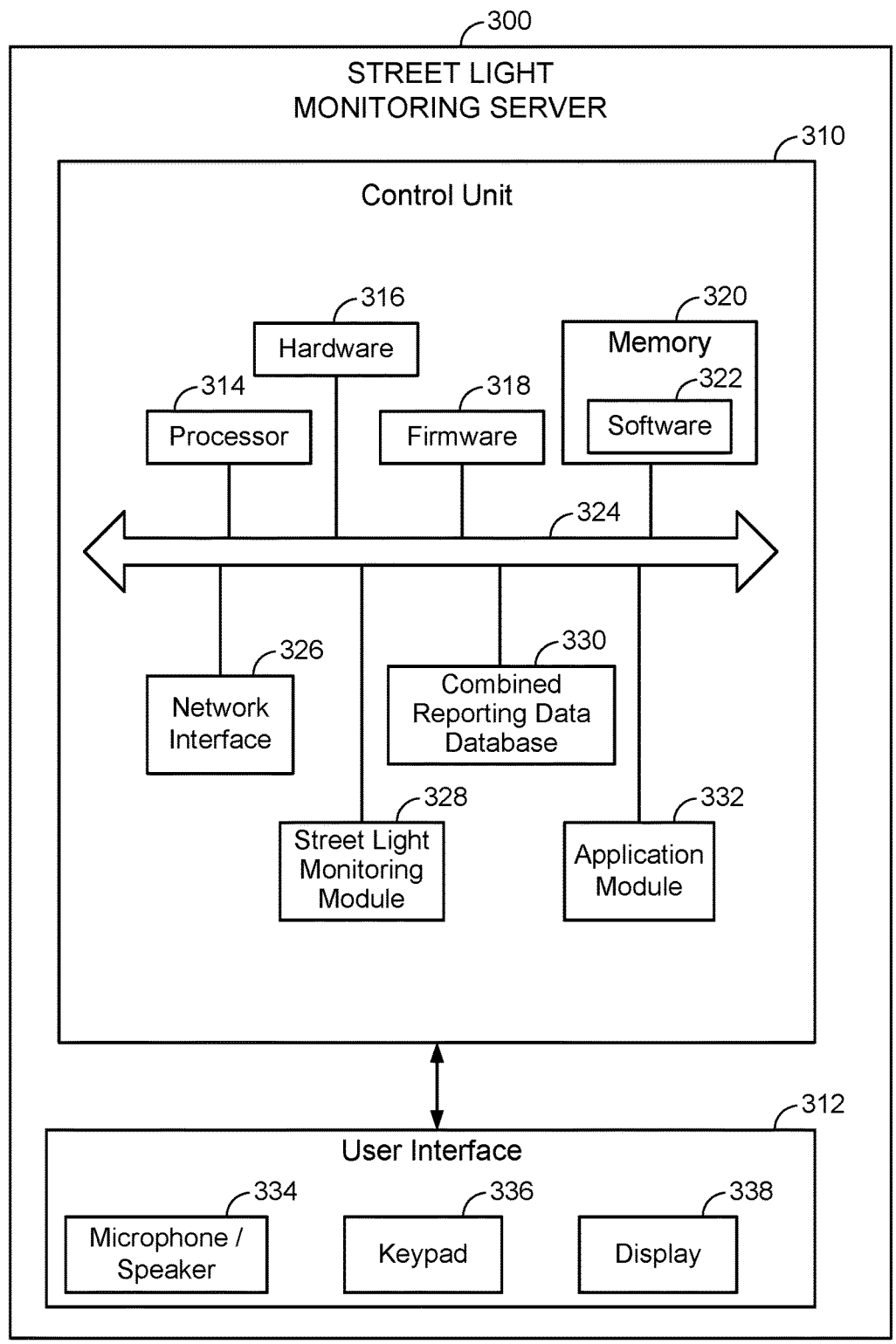
FIG. 3 illustrates an example street light monitoring server for the crowdsourced detection of defective street lights, according to aspects of the disclosure.

FIG. 3 illustrates an example street light monitoring server 300 for the crowdsourced detection of defective street lights, according to aspects of the disclosure. Street light monitoring server 300 is one possible implementation of street light monitoring server 170 of FIG. 1.

The various features and functions illustrated in the diagram of FIG. 3 are connected together using a common data bus 324 which is meant to represent that these various features and functions are operatively coupled together.

Those skilled in the art will recognize that other connections, mechanisms, features, functions, or the like, may be provided and adapted as necessary to operatively couple and configure an actual portable device. Further, it is also recognized that one or more of the features or functions illustrated in the example of FIG. 3 may be further subdivided or two or more of the features or functions illustrated in FIG. 3 may be combined.

Street light monitoring server 300 includes a control unit 310 that is configured to receive reporting data from a plurality of vehicles via network interface 326. Control unit 310 may be provided by a processor 314 and associated memory 320, hardware 316, firmware 318, and software 322.

The processor 314 may include one or more microprocessors, microcontrollers, and/or digital signal processors that provide processing functions, as well as other calculation and control functionality. The processor 314 may also include memory 320 for storing data and software instructions for executing programmed functionality within the street light monitoring server 300. The memory 320 may be on-board the processor 314 (e.g., within the same IC package), and/or the memory may be external memory to the processor 314 and functionally coupled over a data bus 324. The functional details associated with aspects of the disclosure will be discussed in more detail below.

Control unit 310 may further include a street light monitoring module 328, a combined reporting data database 330, and an application module 332. The street light monitoring module 328 may be configured to combine the reporting data received from the plurality of vehicles to generate combined reporting data, comprising combined light intensity data as well as other data, which is then stored in the combined reporting data database 330. The street light monitoring module 328 is also configured to compare the combined light intensity data with a baseline light intensity value associated with a particular a street light to determine whether that street light is defective. If so, the street light monitoring module 328 may generate an indication of a degradation of performance of the street light. In one example, the indication may be in the form of an alert presented to a user of the street light monitoring server 300 via user interface 312. In another example, the indication may be an alert (e.g., an email) automatically transmitted via network interface 326 to the appropriate authority charged with the maintenance of the respective street light.

The alert generated by the street light monitoring module 328 may provide further details as to the nature of the defect of the street light. For example, the alert may indicate a reduction in an expected light output of the respective street light. In another example, the alert may indicate that the street light has stopped working, such that no light is being output from the respective street light.

The application module 332 may be a process running on the processor 314, which requests reporting data and/or combined reporting data from the street light monitoring module 328. These applications typically run within an upper layer of the software architectures, and may include software for managing an outdoor lighting system that includes a plurality of street lights.

Processor 314, street light monitoring module 328, and combined reporting data database 330 are illustrated separately for clarity, but may be a single unit and/or implemented in the processor 314 based on instructions in the software 322 which is run in the processor 314. Processor 314, street light monitoring module 328, and combined reporting data database 330 can, but need not necessarily include, one or more microprocessors, embedded processors, controllers, application specific integrated circuits (ASICs), digital signal processors (DSPs), and the like. The term processor describes the functions implemented by the system rather than specific hardware. Moreover, as used herein the term "memory" refers to any type of computer storage medium, including long term, short term, or other memory associated with street light monitoring server 300, and is not to be limited to any particular type of memory or number of memories, or type of media upon which memory is stored.

The processes described herein may be implemented by various means depending upon the application. For example, these processes may be implemented in hardware 316, firmware 318, processor 314 in combination with software 322, or any combination thereof. For a hardware implementation, the processor 314 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or processor/software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 320 and executed by the processor 314. Memory 320 may be implemented within or external to the processor 314.

If implemented in firmware 318 and/or processor 314 with software 322, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise Random Access Memory (RAM), Read-Only Memory (ROM), Flash Memory, Electrically Erasable Programmable Read Only Memory (EEPROM), Compact Disc Read-Only Memory (CD-ROM) or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The street light monitoring server 300 may include an optional user interface 312 which provides any suitable interface systems, such as a microphone/speaker 334, keypad 336, and display 338 that allows user interaction with the street light monitoring server 300. The microphone/speaker 334 provides for audible alerts to be presented to a user. The keypad 336 comprises any suitable buttons for user input. The display 338 comprises any suitable display, such as, for example, a backlit Liquid Crystal Display (LCD) display, and may further include a touch screen display for additional user input modes.

Figure 4:
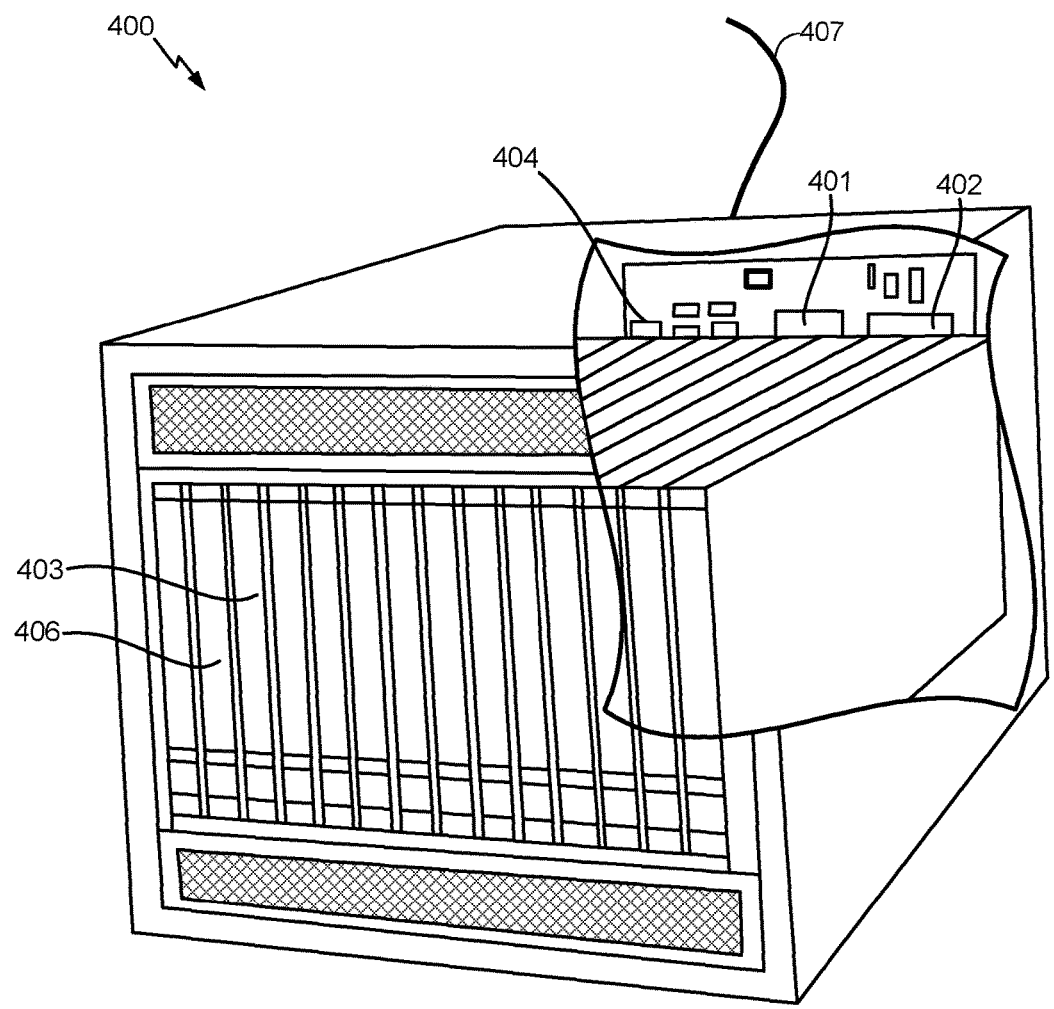
FIG. 4 illustrates a server in accordance with one aspect of the disclosure.

The various embodiments of street light monitoring server 170 and/or 300 may be implemented on any of a variety of commercially available server devices, such as server 400 illustrated in FIG. 4. In an example, the server 400 may correspond to one example configuration of the street light monitoring server 300 described above. In FIG. 4, the server 400 includes a processor 401 coupled to volatile memory 402 and a large capacity nonvolatile memory, such as a disk drive 403. The server 400 may also include a floppy disc drive, CD or DVD disc drive 406 coupled to the processor 401. The server 400 may also include network access ports 404 coupled to the processor 401 for establishing data connections with a network, either wirelessly or via a wired-connection 407, such as a local area network coupled to other broadcast system computers and servers or to the Internet. In context with FIG. 3, it will be appreciated that the server 400 of FIG. 4 illustrates one example implementation of the street light monitoring server 300, whereby the server 400 includes logic configured to receive reporting data from a plurality vehicles, where such logic may be included within or at network access ports 404 used by the server 400 to communicate with the network, either wirelessly or via wired-connection 407. The server 400 may also include logic configured to obtain a baseline light intensity value for a street light which corresponds to the network access ports 404 and/or processor 401. A logic configuration to combine the reporting data received from the plurality of vehicles to generate combined reporting data, the combined reporting data including combined light intensity data, may correspond to processor 401 along with any combination of the volatile memory 402, the disk drive 403 and/or the disc drive 406. Logic configured to compare the combined light intensity data with the baseline intensity value may correspond to processor 401, while logic configured to generate an indication (e.g., an alert) of a degradation of performance of a street light may correspond to processor 401 in combination with network access ports 404 and/or a user interface (not shown in FIG. 4).

Figure 5A:
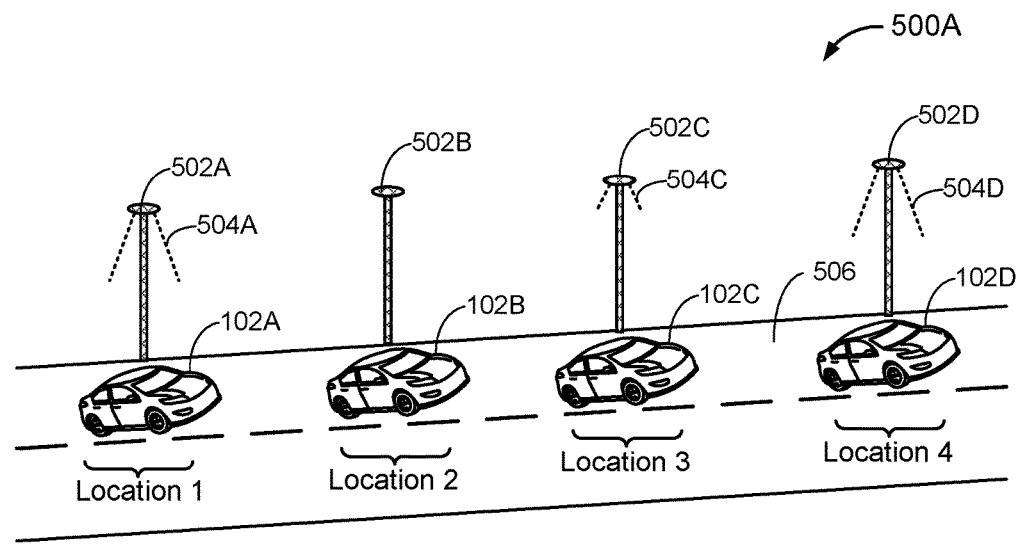
FIG. 5A illustrates an example operating environment for several vehicles for providing reporting data on one or more street lights, according to aspects of the disclosure.

FIG. 5A illustrates an example operating environment 500A for several vehicles 102A-102D for providing reporting data on one or more street lights, according to aspects of the disclosure. The operating environment 500A includes several street lights 502A-502D adjacent to road 506, where street light 502A is at a location 1, street light 502B is at a location 2, street light 502C is at a location 3, and street light 502D is at a location 4. Also shown in FIG. 5A, are vehicles 102A-102D. Vehicle 102A is currently located at location 1, while vehicles 102B-102D are currently located at locations 2-4, respectively. As mentioned above, the vehicles 102A-102D each include a sensor that is configured to measure at least one light intensity value. The vehicles 102A-102D then generate and transmit reporting data that includes the light intensity values and associated times and locations of the light intensity value. For example, vehicle 102A may generate reporting data that includes a light intensity value measured while vehicle 102A is at location 1, a time that the light intensity value was measured, and an indication that the vehicle was located at location 1 (and/or positioning data (such as any combination of latitude, longitude, and altitude) corresponding to location 1) when the light intensity value was measured. Vehicles 102B-102D may generate similar reporting data for their respective locations. Also, as the vehicles 102A-102D continue to travel along road 506, they may continue generating reporting data for each of the illustrated locations. For example, vehicle 102A may generate reporting data for each of the locations 1-4 as vehicle 102D travels on road 506.

Figures 6A, 6B:
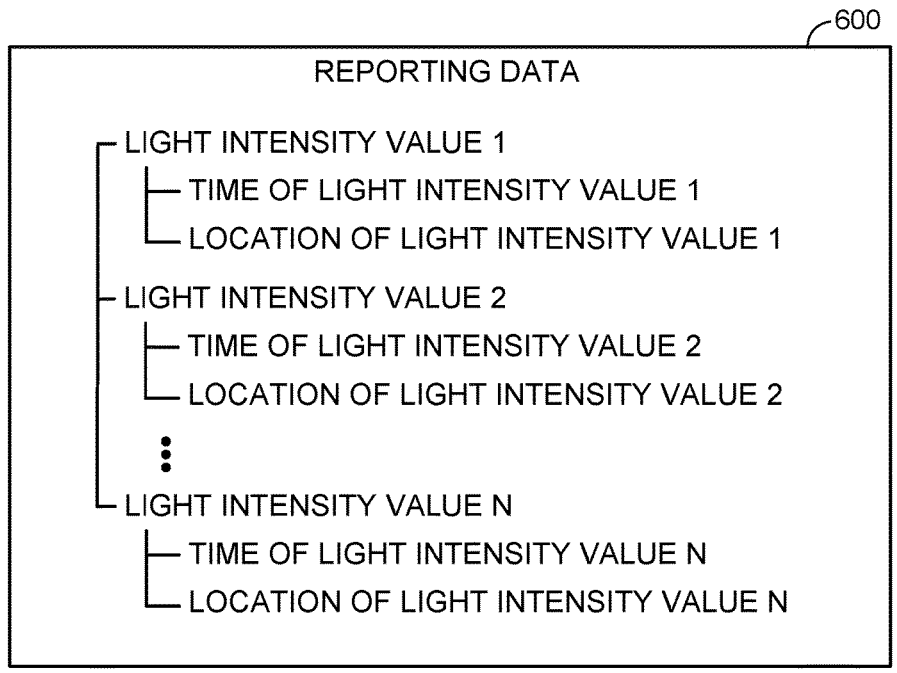
FIG. 6A illustrates an example reporting data provided by a vehicle, according to aspects of the disclosure.
FIG. 6B illustrates an example table maintained by a street light monitoring server for the crowdsourced detection of defective street lights, according to aspects of the disclosure.

FIG. 6A illustrates an example reporting data 600 provided by a vehicle, according to aspects of the disclosure. As shown in FIG. 6A, the reporting data 600 includes multiple light intensity values 1-N and their associated times and locations. For example, light intensity value 1 may correspond to a light intensity value measured by vehicle 102A when in location 1, while light intensity value 2 may correspond to a light intensity value measured by vehicle 102A when in location 2.

With reference to both FIGS. 5A and 6A, and as mentioned above, the vehicles may be configured to continuously generate and store reporting data 600 locally at the vehicle by way of reporting data database 224 (as discussed with reference to FIG. 2), where the reporting data 600 is periodically (or according to a predetermined schedule) uploaded to the street light monitoring server (e.g., 170 or 300 as discussed with reference to FIG. 1 and FIG. 3). However, in some aspects, the vehicles 102A-102D may not have a priori knowledge about the locations of the respective street lights 502A. Thus, some of the light intensity values measured by the vehicles may not necessarily correspond to locations where street lights are also located. Accordingly, in some implementations, the street light monitoring server 300 may be configured to filter the reporting data based on locations of the street lights known to the street light monitoring server 300. That is, the street light monitoring server 300 may include a list of known street lights and their respective locations, where the street light monitoring server 300 discards any light intensity values that do not correspond to a location of one of these known street lights. For example, the location of light intensity value 1 included in reporting data 600 may include a position fix that is within a threshold distance of a known location of street light 502A. Thus, the street light monitoring server 300 may keep light intensity value 1 for further processing. Continuing with this example, the location of light intensity value 2 may include a position fix that is not within a threshold distance of a location of any known street light and thus street light monitoring server 300 may discard light intensity value 2.

As mentioned above, the street light monitoring module 328 of the street light monitoring server 300 is configured to combine each of the reporting data (e.g., reporting data 600) received from a plurality of vehicles (e.g., vehicles 102A-102D) to generate a combined reporting data that is then stored in combined reporting data database 330. As shown in FIG. 5A, the street light 502A is generating a normal (e.g., expected) light output 504A. The street light monitoring module 328 may combine the reporting data for all light intensity values measured by all vehicles 102A-102D while each was at location 1 to determine that street light 502A is indeed functioning as expected. As will be discussed below, combining the reporting data may include generating combined light intensity values by, for example, averaging the light intensity values measured by each of the vehicles 102A-102D while at location 1. The combined light intensity values may then be compared to a baseline intensity value for street light 502A. However, as further shown in FIG. 5A, the street light 502B is defective and is not providing any light output. Thus, the street light monitoring module 328 may determine that the combined reporting data for location 2 indicates that street light 502B is not functioning properly (for example by providing little or no light output) and thus may generate an indication of a degradation of performance for street light 502B. As mentioned above, the indication of a degradation of performance may include generating an alert to a user of the street light monitoring server 300 via user interface 312 and/or generating an alert (e.g., an email) to a maintenance authority responsible for the maintenance of street light 502B.

FIG. 5A further illustrates a street light 502C that has a reduced light output 504C. Thus, the street light monitoring module 328 may determine that the combined reporting data for location 3 indicates that street light 502C is not functioning properly and thus may generate an indication of a degradation of performance for street light 502C. In one implementation, the alert generated for street light 502C may simply indicate that street light 502C is not functioning properly. In another implementation, the alert generated for street light 502C may indicate a reduction in the expected light output of street light 502C.

FIG. 6B illustrates an example table 602 maintained by a street light monitoring sever 300 (as discussed with reference to FIG. 3) for the crowdsourced detection of defective street lights, according to aspects of the disclosure. Table 602 is one possible implementation of the combined reporting data stored in combined reporting data database 330 (as discussed with reference to FIG. 3). The table 602 includes a column 604 which corresponds to known locations of a street light. For example, location 1 included in column 604 may correspond to location 1 of street light 502A shown in FIG. 5A, whereas location 2 may correspond to location 2 of street light 502B. Column 606 of table 602 corresponds to the number (e.g., count) of reporting data received for each respective location. That is, as shown in the example of FIG. 6B, 14,000 light intensity values have been received for location 1, whereas 10,000 light intensity values have been received for location 65.

Column 608 corresponds to an average of the light intensity values for each respective location, and may be referred to herein as combined light intensity data. For example, the average light intensity value for location 1 may be determined by street light monitoring module 328 (as discussed with reference to FIG. 3) by averaging all 14,000 light intensity values received for location 1. In one implementation the average light intensity value is compared with a baseline intensity value so that the average value expressed in column 608 is a percentage that the computed average is of a baseline light intensity value for the respective street light. That is, the street light monitoring server 300 may include baseline light intensity values for each street light included in an expected operating environment. The baseline light intensity values may be based on manufacturer data of each street light. These baseline light intensity values may be input by a user or automatically retrieved via network interface 326 from a manufacturer's website, or other database.

In another example, the baseline light intensity values may be obtained from previously received reporting data. That is, street light monitoring module 328 may be configured to establish the baseline light intensity value for a street light by looking at previous reporting data received corresponding to each street light. Previous reporting data that indicates a stable performance of a street light over an extended period of time may be used to establish the baseline light intensity value for a respective street light.

Table 602 also includes a column 614 corresponding to expected light intensity values for each location. In some examples the expected light intensity value is 100% of the baseline intensity value for a street light at a location. However, street light monitoring module 328 may be configured to adjust the expected light intensity value based on one or more metrics such as age of the bulb, other known possible scenarios of light obstruction that may cause the expected light intensity value to be less than baseline intensity value. For example, the expected light intensity value for location 1 may be determined by street light monitoring module 328 to be 95% of the baseline intensity value for that street light. Accordingly, during operation, the street light monitoring module 328 may compare the average light intensity value of column 608 with the expected light intensity value of the column 614 in order to make a determination as to the operability of a respective street light. For example, FIG. 6B illustrates an average light intensity value for location 1 as 95%. However, the expected light intensity value for location 1 is also 95%. Thus, street light monitoring module 328 may determine that the street light at location 1 is operating normally as the average light intensity value is equal to or greater than the expected light intensity value for location 1.

Continuing with the example of FIG. 6B, the average light intensity value for location 2 is illustrated as 65%, while the corresponding expected light intensity value is 80%. Accordingly, the street light monitoring module 328 may generate an indication of a degradation of performance of the street light at location 2. In one example, the indication may be an alert presented to a user of server 300 and/or an automated message (e.g., email) sent to the authority responsible for the maintenance of the street light at location 2. The indication of the degradation of performance may include identifying information of the street light at location 2. The indication of the degradation of performance may also include an indication as to the nature of the degradation of performance. For example, the indication may simply indicate that the street light is malfunctioning, or it may specifically indicate that there is a reduction in an expected light output of that street light. In another example, the indication specifically indicates the average light intensity value and/or a difference between the average light intensity value and the expected light intensity value. Furthermore, with regards to the example data for location 65 in FIG. 6B, an indication as to the degradation of performance may indicate that the street light at location 65 has stopped working such that no light is being output by the street light at location 65. By providing further information such as this to the authority responsible for the maintenance of the street lights, priority may be given to the repair of certain lights over others.

Turning now to column 610, of table 602, this column represents the date of the respective reporting data included in each row. For example, the first row of table 602 includes the combined reporting data for all the reporting data measured for location 1 on May $27^{th}$. Thus, in one implementation, locations may have multiple entries for each date that reporting data is measured. That is, location 1 may have a row in table 602 corresponding to all reporting data measured on May $27^{th}$, while location 1 may also have an additional row (not shown) in table 602 corresponding to another date that reporting data is measured for that location. In one example, the combined reporting data for the first row of table 602 includes reporting data for location 1, where the measurements began on May $27^{th}$ and continued until sometime the next day (e.g., sunrise of May $28^{th}$). Thus, in some examples, the column 610 represents the date during which sunset occurred, where the combined reporting data of each row may also include reporting data from the following day.

In some aspects, street light monitoring module 328 is configured to filter the received reporting data based on a sunset time and/or sunrise time for each corresponding location. That is, only reporting data measured after sunset and before sunrise may be utilized such that the street lights are the most probable source of light measured by the vehicles. Thus, for each location included in table 602, the street light monitoring server may obtain a known sunset and sunrise times. The reporting data 600 may then be filtered to discard light intensity values that we measured before the sunset and/or after the sunrise times for the corresponding locations. For example, a location 1 may have a sunset time (e.g., 7:05 PM) later than location 2 (e.g., 7:00 PM), and thus light intensity values measured at 7:02 PM may be allowed for location 2, but not for location 1. Furthermore, sunset and sunrise times vary throughout the year, determined by the axial tilt of the earth, daily rotation of the earth, the planet's movement in its annual elliptical orbit around the sun, as well as the Earth and Moon's paired revolutions around each other. Thus, the sunset and sunrise times for each location may be adjusted corresponding to the date that the light intensity values were measured so as to more accurately filter the reporting data.

Figure 5B:
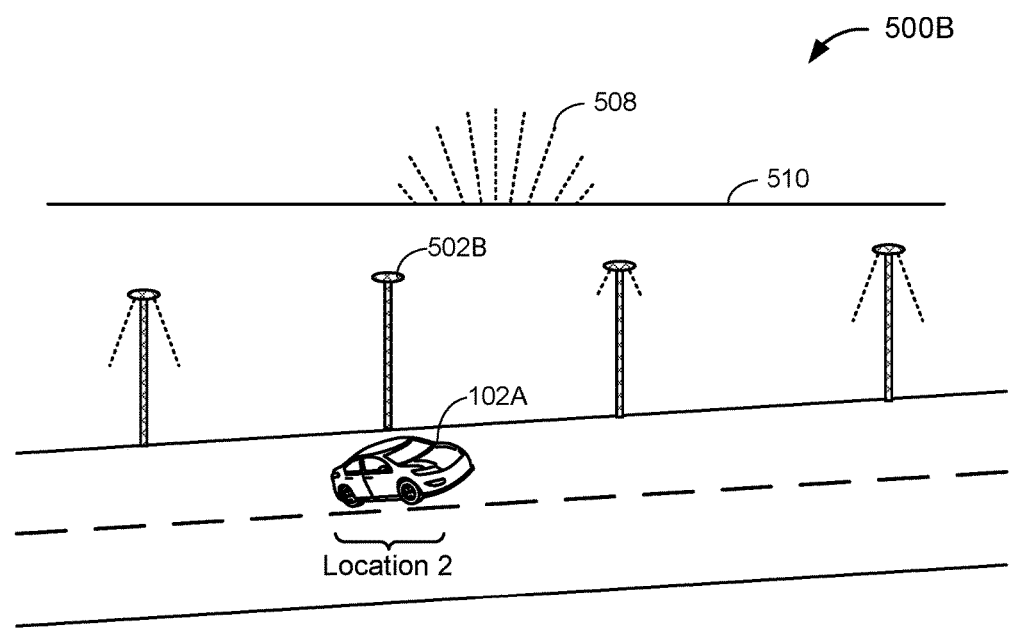
FIG. 5B illustrates an example operating environment that includes non-street light illumination for a vehicle providing reporting data on one or more street lights, according to aspects of the disclosure.

The street light monitoring server 300 may also be configured to weight the light intensity values included in the reporting data based on an estimated non-street light illumination. This non-street light illumination may correspond to ambient light in the sky prior to dusk and/or after dawn (i.e., twilight). For example, FIG. 5B illustrates an operating environment 500B during twilight where the sun is below horizon 510, yet is still generating ambient light 508 detected by the light sensor of vehicle 102. That is, even though street light 502B is defective and not producing any light, the sensor of vehicle 102A still measures a light intensity value, but due to ambient light 508. Thus, in one example, the street light monitoring module 328 is configured to weight the light intensity values based on a respective time that the light intensity values were measured by the vehicle, such that light intensity values measured during twilight are weighted less than light intensity values measured during nighttime (i.e., after dusk and prior to dawn). In one aspect, the term "twilight" corresponds to civil twilight, nautical twilight, or astronomical twilight.

As mentioned above, the location included in the reporting data received by the street light monitoring server 300 may also include a heading of the vehicle when the light intensity value was measured. Thus, for light intensity values measured during twilight, the street light monitoring module 328 may further adjust the weights applied to the light intensity values based on the heading. For example, light intensity values for headings that indicate that the light sensor of the vehicle was directed westwards during dusk may be weighted less than light intensity values for headings that indicate the light sensor of the vehicle was directed eastwards during dusk.

Figure 5C:
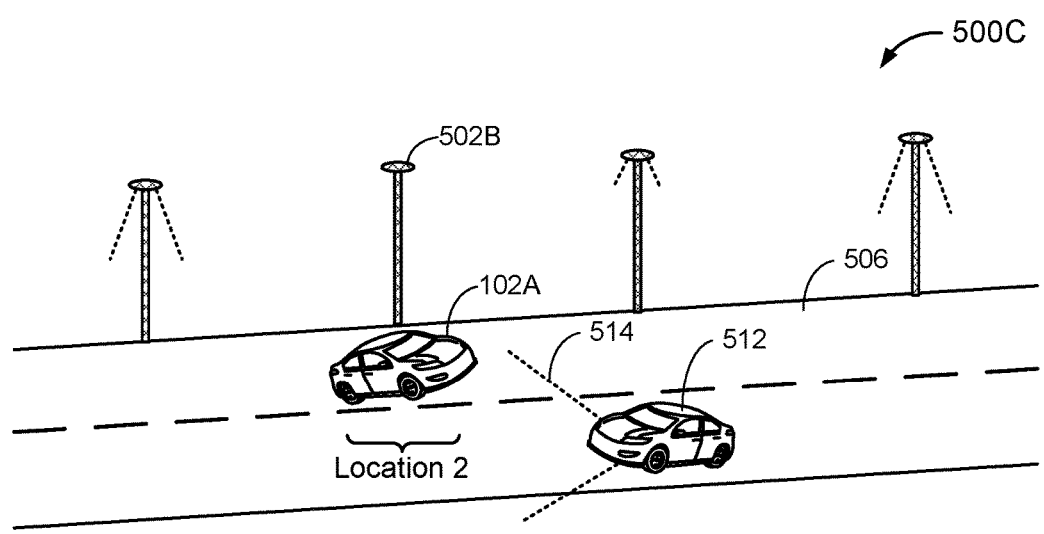
FIG. 5C illustrates another example operating environment that includes non-street light illumination for a vehicle providing reporting data on one or more street lights, according to aspects of the disclosure.

The non-street light illumination may also correspond to light received from the headlights of an oncoming vehicle. For example, FIG. 5C illustrates an operating environment 500C where an oncoming vehicle 512 is approaching vehicle 102A while the sensor of vehicle 102A is measuring a light intensity value at location 2. Thus, even though street light 502B is defective and not producing any light, the sensor of vehicle 102A still measures a light intensity value, but due to light 514 generated by the headlights of oncoming vehicle 512. Thus, in one example, the street light monitoring module 328 is configured to weight the light intensity values based on a probability that there was an oncoming vehicle when the light intensity value was measured. Column 612 of the table 602 corresponds to the oncoming vehicle probability determined by street light monitoring module 328 for each location. In one example, street light monitoring module 328 may determine the probability of oncoming vehicles based on a type of road 506 that vehicle 102A was traveling on when the light intensity value was measured. For example, if the type of road 506 is a freeway or expressway then the probability of oncoming vehicles is relatively high, whereas if the type of road 506 is a side street or backroad, then the probability of oncoming vehicles may be lower.

In another example, the street light monitoring module 328 may determine the probability of oncoming vehicles based on previously received reporting data. That is a large number of reporting data (e.g., column 606) may indicate a higher probability of oncoming vehicles, whereas a lower number of reporting data may indicate a lower probability of oncoming vehicles. Accordingly, the street light monitoring module 328 may be configured to weight the light intensity values based on an estimated probability of an oncoming vehicle (i.e., column 612), such that light intensity values measured for locations with a high probability of oncoming vehicles are weighted less than light intensity values measured for locations with a lower probability of oncoming vehicles.

As mentioned above, the location included in the reporting data received by the street light monitoring server 300 may also include a heading of the vehicle when the light intensity value was measured. Furthermore, certain roads may have known traffic patterns (e.g., known eastbound congestion in the mornings, and known westbound congestion in the evenings, etc.). Thus, the street light monitoring module 328 may further adjust the probability of oncoming vehicles included in column 612 based on the heading included in the reporting data and a known traffic pattern for that location.

Figure 7:
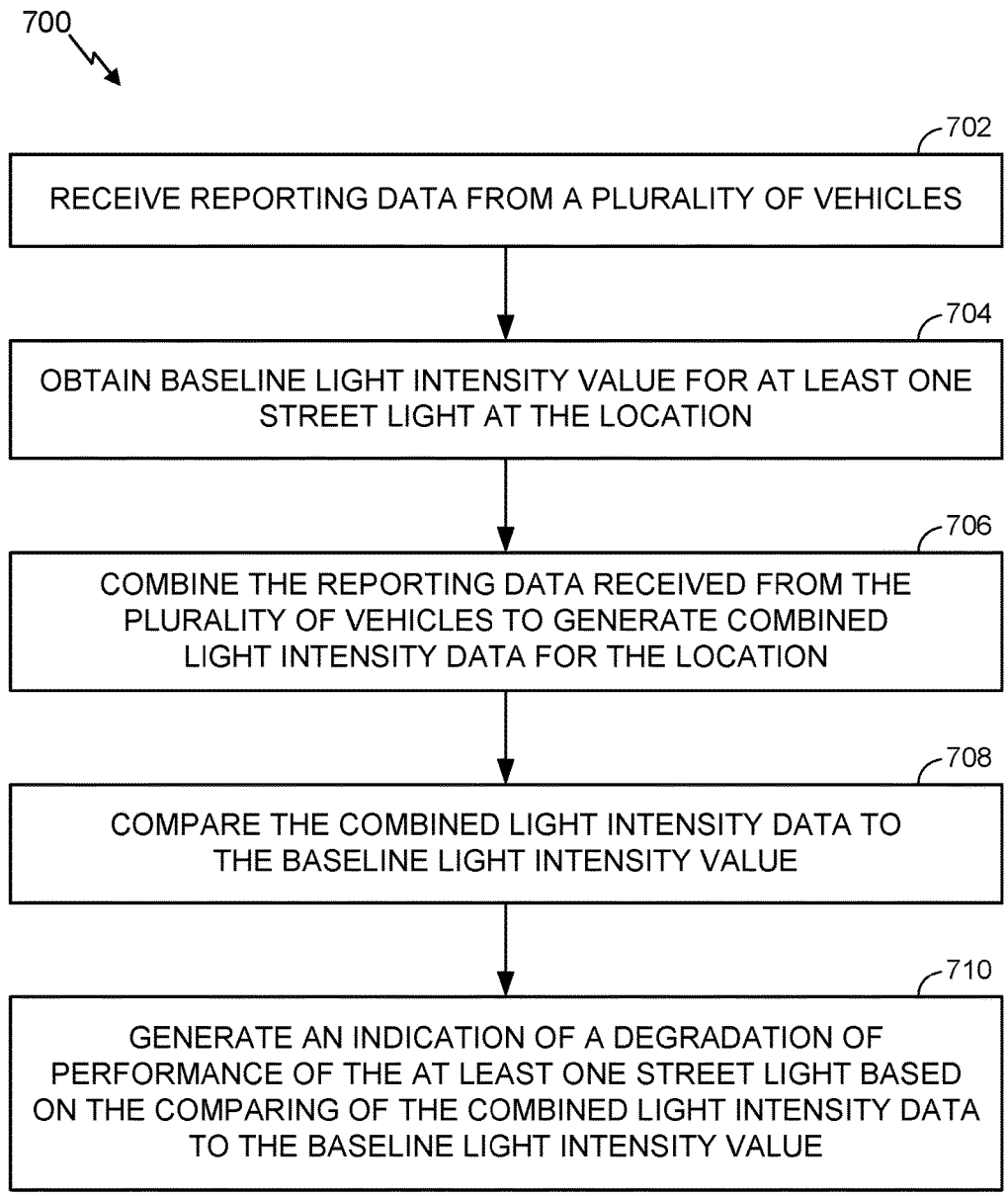
FIG. 7 is a flowchart illustrating a process of crowdsourced detection of defective street lights, according to aspects of the disclosure.

FIG. 7 is a flowchart illustrating a process 700 of the crowdsourced detection of defective street lights, according to aspects of the disclosure. Process 700 may be performed by street light monitoring server 170, 300 and/or 400.

In a process block 702, the network interface 326 of street light monitoring server 300 receives reporting data from a plurality of vehicles (e.g., reporting data 600 received from vehicle 102A, reporting data 600 received from vehicle 102B, etc.). Next, in process block 704, the street light monitoring module 328 obtains a baseline intensity value for at least one street light at the location. As mentioned above, the baseline intensity value may be obtained from manufacturer's data corresponding to the street light, and/or may be manually input by a user, and/or may be determined based on previously received reporting data. In a process block 706, the street light monitoring module 328 combines the reporting data received from the plurality of vehicles to generate combined light intensity data for the location. The combining of the reporting data may include filtering the reporting data based on a time that the light intensity values were measured (e.g., with respect to sunset and sunrise times). The combining of the reporting data may also include weighting the light intensity values based on estimated non-street light illumination (e.g., due to ambient light during twilight and/or due to the probability of oncoming vehicles). The combined light intensity data may then be stored at street light monitoring server 300 in the combined reporting data database 330 (e.g., such as table 602).

Next, in a process block 708, the street light monitoring module 328 compares the combined light intensity data to the baseline light intensity value. By way of example, the street light monitoring module 328 may compare the combined light intensity data with the baseline light intensity value in order to generate the average light intensity value of column 608 of table 602. The street light monitoring module 328 may then compare the light intensity data (e.g., average light intensity value of column 608) with the expected light intensity value of column 614 for a respective location. Based on this comparison, process block 710 generates an indication of a degradation of performance of at least one street light.

Figure 8:
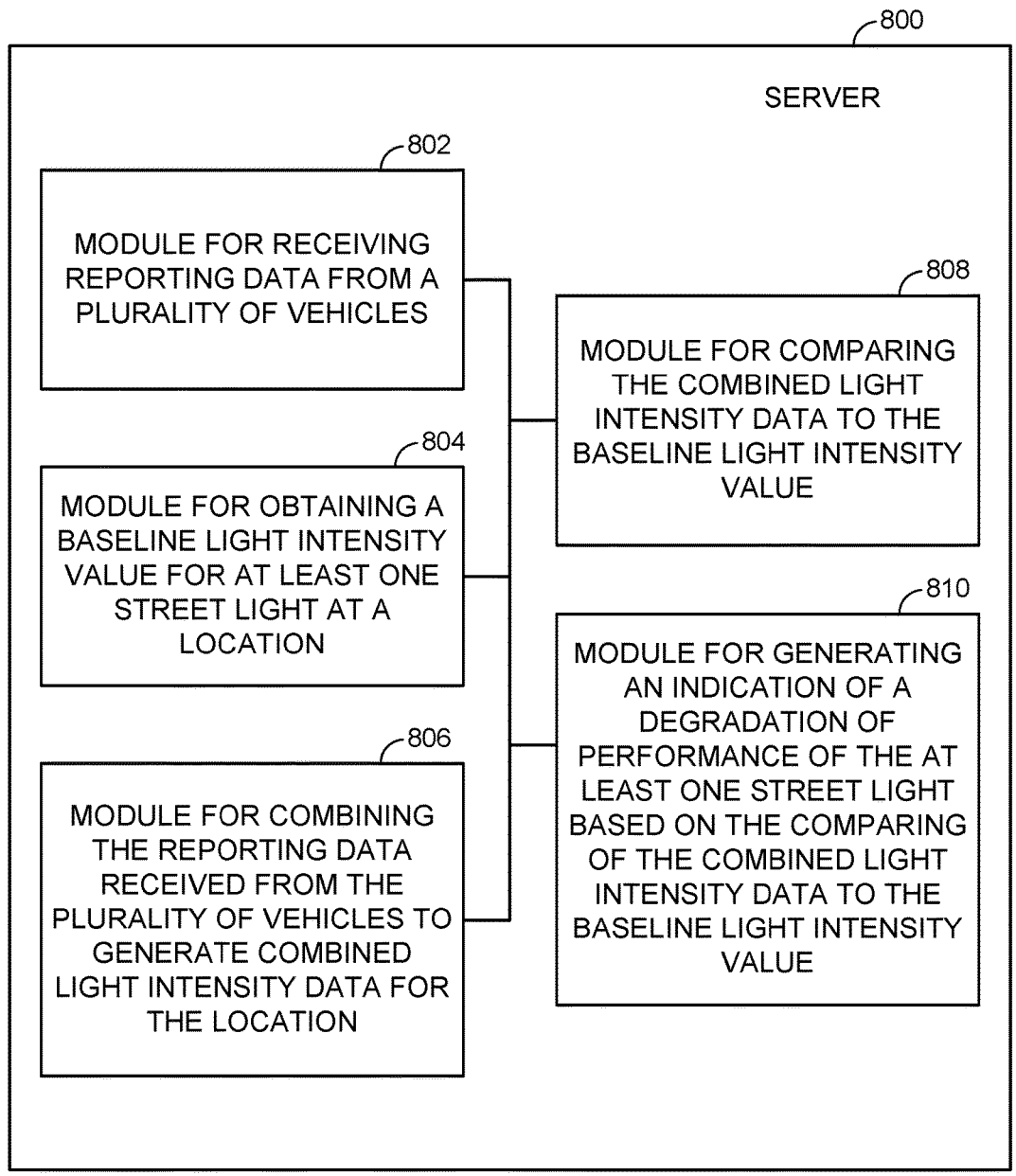
FIG. 8 illustrates several sample aspects of components that may be employed in a server configured to support the crowdsourced detection of defective street lights, as taught herein.

FIG. 8 illustrates several sample aspects of components that may be employed in a server 800 configured to support the crowdsourced detection of defective street lights, as taught herein. Server 800 is one possible implementation of street light monitoring server 170, 300, or 400.

A module 802 for receiving reporting data from a plurality of vehicles may correspond at least in some aspects to, for example, a network interface 326 of FIG. 3. A module 804 for obtaining a baseline light intensity value for at least one street light at a location may correspond at least in some aspects to, for example, network interface 326 and/or street light monitoring module 328 of FIG. 3. A module 806 for combining the reporting data received from the plurality of vehicles to generate combined light intensity data for the location may correspond at in some aspects to, for example, street light monitoring module 328, processor 314, and/or combined reporting data database 330. A module 808 for comparing the combined light intensity data to the baseline light intensity value may correspond at in some aspects to, for example, street light monitoring module 328 and/or processor 314, of FIG. 3. A module 810 for generating an indication of a degradation of performance of the at least one street light based on the comparing of the combined light intensity data to the baseline light intensity value may correspond at in some aspects to, for example, street light monitoring module 328, processor 314, and/or network interface 326 of FIG. 3.

The functionality of the modules 802-810 of FIG. 8 may be implemented in various ways consistent with the teachings herein. In some designs, the functionality of these modules 802-810 may be implemented as one or more electrical components. In some designs, the functionality of these modules 802-810 may be implemented as a processing system including one or more processor components. In some designs, the functionality of these modules 802-810 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects, one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method, comprising:
   receiving reporting data from a plurality of vehicles, wherein the reporting data comprises:
      at least one light intensity value measured by at least one sensor of a respective vehicle of the plurality of vehicles,
      a time that the at least one light intensity value was measured by the respective vehicle, and
      a location of the respective vehicle at the time that the at least one light intensity value was measured;
   obtaining a baseline light intensity value for at least one street light at the location;
   combining the reporting data received from the plurality of vehicles to generate combined light intensity data for the location;
   comparing the combined light intensity data to the baseline light intensity value; and
   generating an indication of a degradation of performance of the at least one street light based on the comparing of the combined light intensity data to the baseline light intensity value.

2. The method of claim 1, wherein the indication of the degradation of the performance indicates a reduction in an expected light output of the at least one street light.

3. The method of claim 1, wherein the indication of the degradation of the performance indicates that the at least one street light has stopped working such that no light is output from the at least one street light.

4. The method of claim 1, wherein the at least one sensor is an outwards-facing light sensor integrated into a windshield of the respective vehicle.

5. The method of claim 1, further comprising filtering the reporting data based on a sunset time and a sunrise time at the location of the respective vehicle where the at least one light intensity value was measured.

6. The method of claim 5, wherein filtering the reporting data comprises generating the combined light intensity data based on light intensity values only measured between the sunset time and the sunrise time.

7. The method of claim 1, wherein combining the reporting data received from the plurality of vehicles to generate combined light intensity data for the location comprises weighting the light intensity values included in the reporting data based on an estimated non-street light illumination.

8. The method of claim 7, wherein weighting the light intensity value comprises determining the estimated non-street light illumination based on a respective time that the light intensity value was measured by the respective vehicle.

9. The method of claim 7, wherein weighting the light intensity value comprises determining the estimated non-street light illumination by determining a probability that there was an oncoming vehicle to the respective vehicle.

10. The method of claim 9, wherein determining the probability that there was an oncoming vehicle to the respective vehicle comprises determining a type of road that the respective vehicle was traveling on when the light intensity value was measured.

11. The method of claim 9, wherein determining the probability that there was an oncoming vehicle to the respective vehicle comprises determining the probability based on previously received reporting data.

12. The method of claim 1, wherein obtaining the baseline light intensity value for the at least one street light comprises establishing the baseline light intensity value from manufacturer data of the at least one street light.

13. The method of claim 1, wherein obtaining the baseline light intensity value for the at least one street light comprises establishing the baseline light intensity value from previously received reporting data.

14. The method of claim 1, wherein the location included in the reporting data comprises a position fix of the respective vehicle when the light intensity value was measured.

15. An apparatus, comprising:
   means for receiving reporting data from a plurality of vehicles, wherein the reporting data comprises:
      at least one light intensity value measured by at least one sensor of a respective vehicle of the plurality of vehicles,
      a time that the at least one light intensity value was measured by the respective vehicle, and
      a location of the respective vehicle at the time that the at least one light intensity value was measured;
   means for obtaining a baseline light intensity value for at least one street light at the location;
   means for combining the reporting data received from the plurality of vehicles to generate combined light intensity data for the location;
   means for comparing the combined light intensity data to the baseline light intensity value; and
   means for generating an indication of a degradation of performance of the at least one street light based on the comparing of the combined light intensity data to the baseline light intensity value.

16. The apparatus of claim 15, wherein the means for combining the reporting data received from the plurality of vehicles to generate combined light intensity data for the location comprises means for weighting the light intensity values included in the reporting data based on an estimated non-street light illumination.

17. The apparatus of claim 16, wherein the means for weighting the light intensity value comprises means for determining the estimated non-street light illumination based on at least one of:
   a respective time that the light intensity value was measured by the respective vehicle; and
   a probability that there was an oncoming vehicle to the respective vehicle.

18. An apparatus, comprising:
   at least one processor; and at least one memory coupled to the at least one processor, the at least one processor and the at least one memory being configured to direct the apparatus to:
  receive reporting data from a plurality of vehicles, wherein the reporting data comprises:
    at least one light intensity value measured by at least one sensor of a respective vehicle of the plurality of vehicles,
    a time that the at least one light intensity value was measured by the respective vehicle, and
    a location of the respective vehicle at the time that the at least one light intensity value was measured;
  obtain a baseline light intensity value for at least one street light at the location;
  combine the reporting data received from the plurality of vehicles to generate combined light intensity data for the location;
  compare the combined light intensity data to the baseline light intensity value; and
  generate an indication of a degradation of performance of the at least one street light based on a comparison of the combined light intensity data to the baseline light intensity value.

19. The apparatus of claim 18, wherein the at least one processor and the at least one memory are further configured to direct the apparatus to weight the light intensity values included in the reporting data based on an estimated non-street light illumination.

20. The apparatus of claim 19, wherein the at least one processor and the at least one memory are further configured to determine the estimated non-street light illumination based on at least one of:
  a respective time that the light intensity value was measured by the respective vehicle; and
  a probability that there was an oncoming vehicle to the respective vehicle.

* * * * *